United States Patent Office 3,340,297
Patented Sept. 5, 1967

3,340,297
PRODUCTION OF AMINOAROYLSULFONYL IMIDES
Matthias Seefelder, Ludwigshafen (Rhine), Germany, assignor to Badische Anilin- & Soda-Fabrik Aktiengesellschaft, Ludwigshafen (Rhine), Germany
No Drawing. Filed Aug. 18, 1964, Ser. No. 390,461
3 Claims. (Cl. 260—556)

This invention concerns a process for the production of new aminoaroylsulfonyl imides which are obtained by reacting tertiary aromatic amines with sulfonyl isocyanates, and the new products obtained by the process.

It is known that sulfonyl imides are obtained by reacting a sulfonamide with an acyl chloride in the presence of a base. The yields obtained in this process are only moderate.

It is an object of this invention to provide a new process for the production of aminoaroylsulfonyl imides in which these substances are obtained in very good yields. A further object of this invention is to provide a process in which aminoaroylsulfonyl imides are obtained from the readily accessible starting materials.

I have found that aminoaroylsulfonyl imides of the formula

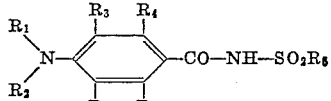

I are obtained by reacting tertiary aromatic amines of the formula

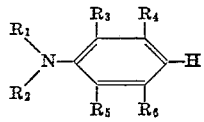

II with sulfonyl isocyanates of the formula $$OCN-SO_2-R_7$$ III in an inert organic solvent. In the formulae the groups $R_1$ and $R_2$ are cycloalkyl groups with 5 to 8 carbon atoms, arylalkyl groups with 7 to 10 carbon atoms, alkyl groups with 1 to 6 carbon atoms, which may be substituted by an alkoxy group with 1 to 4 carbon atoms, a cyano group or a chlorine atom. The groups $R_1$ and $R_2$ may form a 5 to 6 membered saturated ring together with the nitrogen atom to which they are attached, and this ring may contain in addition an oxygen or sulfur atom. The groups $R_3$, $R_4$, $R_5$ and $R_6$ in the Formulae I and II are hydrogen, alkyl with 1 to 4 carbon atoms, alkoxy with 1 to 4 carbon atoms, chlorine or bromine, while $R_7$ is chlorine, alkyl with 1 to 6 carbon atoms, cycloalkyl with 5 to 8 carbon atoms or aryl with 6 to 10 carbon atoms. The groups $R_3$ and $R_4$ may form a condensed benzene ring together with the carbon atoms to which they are attached. The groups $R_1$ and $R_3$, when taken together, may form a 5 or 6 membered heterocyclic ring containing the nitrogen atom to which $R_1$ is attached, which ring can be condensed with a further 6 membered carbocyclic ring, such as a benzene or cyclohexane ring.

Stated alternatively, the above aminoaroylsulfonyl imides in which $R_1$ and $R_2$, $R_3$ and $R_4$, and $R_1$ and $R_3$ are taken together have the respective formulae:

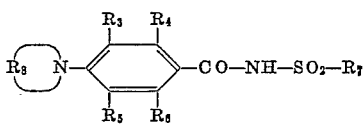

IV

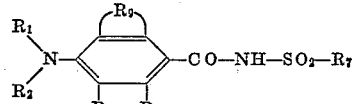

V

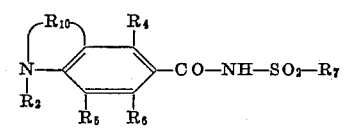

VI wherein $R_8$ is a divalent, saturated group consisting of —$CH_2$— groups, and zero to one —O— or —S— groups and forming with the N atom a 5–6 membered ring; $R_9$ is a divalent hydrocarbon group forming a benzene ring with the two carbons to which $R_9$ is attached; and $R_{10}$ is a member from the group consisting of a divalent group forming a 5–6 membered heterocyclic ring with its N atom and a divalent group forming a 5–6 member heterocyclic ring with its N atom, said ring being condensed with a 6 carbon carbocyclic ring.

Stated alternatively, the corresponding tertiary aromatic amines have the respective formulae:

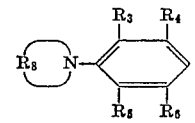

VII

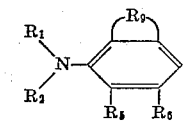

VIII and

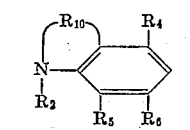

IX wherein $R_8$, $R_9$ and $R_{10}$ have the same meaning as defined above.

The reaction of amines of the Formula II with isocyanates of the Formula III was hitherto unknown. If dimethyl aniline and p-toluene sulfonyl isocyanate are used the reaction proceeds according to the following mechanism:

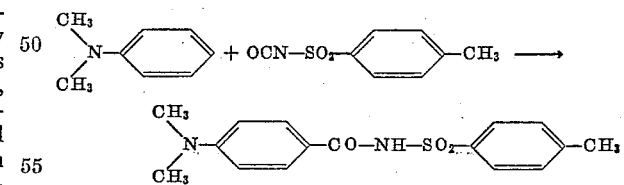

Tertiary aromatic amines of the Formula II containing a hydrogen atom in the para-position to the amino group can be employed in the process described. Suitable substances are for example N,N-dimethylaniline, N,N-diethylaniline, N,N-di-n-butylaniline, N,N-isobutylaniline, N - methyl - N - isobutylaniline, N - ethyl - N - cyanoethylaniline, N - ethyl - N - ethoxyethylaniline, N - phenylpyrrolidine, N - phenyl - morpholine, N - phenylthiomorpholine, N - methyl - 1,2,3,4 - tetrahydroquinoline, N - methylhexahydrocarbazole, N - methyl - N - cyclohexylaniline, N - ethyl - N - cyclooctylaniline, N,N - dibenzylaniline, m - dimethylaminoanisol, o - chlorodiethylaniline, m - dimethyltoluidine and α - dimethylaminonaphthalene.

Chlorosulfonyl isocyanate, aliphatic or aromatic sulfonyl isocyanates may be used as isocyanates of the Formula III. Suitable sulfonyl isocyanates are for example chlorosulfonyl isocyanate, ethanesulfonyl isocyanate, n-propylsulfonyl isocyanate, benzenesulfonyl isocyanate, p-toluenesulfonyl isocyanate and cyclohexylsulfonyl isocyanate. These substances can be readily produced by reacting phosgene or oxalyl chloride with the corresponding sulfonamide.

Suitable inert organic solvents are those which do not react with isocyanate groups. Thus hydrocarbons such as hexane, heptane, dodecane, benzene, toluene, xylene, cyclohexane and methylcyclohexane, and chlorinated hydrocarbons such as chloroform, carbon tetrachloride, 1,2-dichloroethane, chlorobenzene, o- and m-dichlorobenzene and o-chlorotoluene may be employed. Ethers such as dibutyl ether and anisol may also be used as solvents.

In carrying out the process it is advantageous to use the starting material in a molar ratio of 1:1. An excess of either of the reaction partners may also be used, as for example up to 5 fold molar excess. The process may be carried out at room temperature although it is preferably carried out at temperatures between 25° and 80° C. The reaction is exothermic so that it is often expedient to cool the reaction vessel during the reaction. The completion of the reaction is indicated, for example, by the fact that the temperature of the reaction mixture falls without external cooling and by the disappearance of the isocyanate odor. The imide usually precipitates on completion of the reaction, on cooling the reaction mixture at the latest, and can be separated off by filtration or centrifugation. It is also possible to add aqueous alkali to the reaction mixture at room temperature so that the imide goes into solution and can be precipitated with an acid such as hydrochloric acid if necessary after separation of undissolved material.

The aminoaroylsulfonyl imides obtained as described are valuable intermediates for the production of dyes and pharmaceuticals. The compounds themselves have a depressant effect on the blood sugar level. The corresponding p-aminobenzoic acids are obtained by boiling with aqueous alkali as for example with 2 N caustic soda. Thus p-dimethylaminobenzoic acid is obtained from p-dimethylaminobenzoyl-p-toluenesulfonyl imide.

The quantities given in the examples are parts by weight.

Example 1

20 parts benzene, 19.7 parts p-toluenesulfonyl isocyanate and 12.1 parts dimethylaniline are mixed at room temperature and the mixture stirred with cooling as soon as the tempreature rises above 35° C. Crystals begin to separate out after about 30 minutes. No further production of heat is observed after a further 30 minutes. The mixture is allowed to stand overnight to enable the crystallization to proceed to completion and the very stiff crystal slurry filtered off and washed with a small amount of benzene. 28.5 parts crude p-dimethylaminobenzoyl-p'-toluenesulfonyl imide of the formula

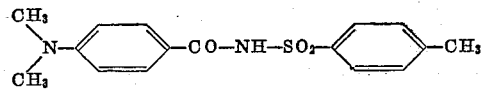

are obtained. The compound melts at 199° to 200° C. after recrystallization from alcohol.

Example 2

19.7 parts p-toluenesulfonyl isocyanate are reacted with 14.9 parts diethylaniline as described in Example 1. 30.5 parts p-diethylaminobenzoyl-p'-toluenesulfonyl imide of the formula

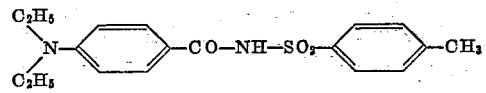

are obtained. The compound melts at 180° to 180.5° C. after recrystallization from alcohol.

Example 3

19.7 parts p-toluenesulfonyl isocyanate are reacted with 20.5 parts di-n-butylaniline in the manner described. 39 parts crude p-di-n-butylaminobenzoyl-p'-toluenesulfonyl imide of the formula

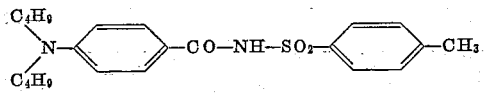

are obtained. The compound melts at 161° to 163° C. after recrystallization from alcohol.

Example 4

58.5 parts p-toluenesulfonyl isocyanate are reacted with 44 parts N-phenylpyrrolidine by the method described in Example 1 in 65 parts benzene. 92 parts crude p-pyrrolidinobenzoyl-p'-toluenesulfonyl imide of the formula

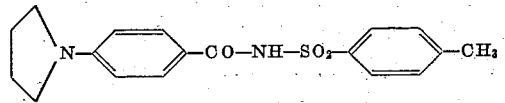

are obtained. The compound melts at 274° to 275° C. with decomposition after recrystallization from glacial acetic acid.

Example 5

18.3 parts benzenesulfonyl isocyanate are reacted with 14.9 parts diethylaniline by the method described in Example 1. 25 parts p-diethylaminobenzoyl-benzenesulfonyl imide of the formula

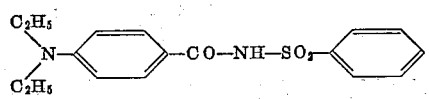

are obtained. The compound melts at 247° C. after recrystallization from dioxane.

Example 6

18.3 parts benzene sulfonyl isocyanate are reacted with 20.5 parts di-n-butylaniline in the manner described. 27 parts p-di-n-butylaminobenzoyl-benzenesulfonyl imide of the formula

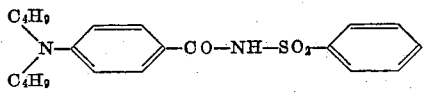

are obtained. The compound melts at 143° to 144° C. after recrystallization from alcohol.

Example 7

20 parts tosyl isocyanate, 17.5 parts N-ethyl-N-β-cyanethylaniline and 16 parts benzene are heated for 6 hours at 40° C. The reaction product is filtered off and 14 parts crude p-(ethyl-β-cyanoethylamino)-benzoyl-p'-toluenesulfonyl imide of the formula

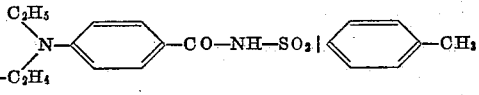

are obtained. The compound melts at 168° to 170° C. after recrystallization from alcohol.

Example 8

20 parts tosyl isocyanate, 18.1 parts N-m-chloro-phenyl-pyrrolidine and 16 parts of benzene are reacted by the method described in Example 7. 27 parts crude p-pyrrolidino-o-chlorobenzoyl-p'-toluenesulfonyl imide of the formula

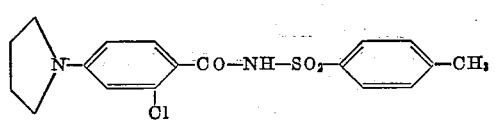

Example 9

20 parts tosyl isocyanate, 18 parts N-di-n-propylaniline and 16 parts benzene are reacted by the method described in Example 1. 29 parts crude p-di-n-propylaminobenzoyl-p'-toluenesulfonyl imide of the formula

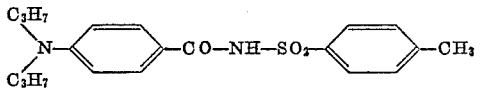

are obtained. The compound melts at 147° to 149° C. after recrystallization from alcohol.

Example 10

20 parts tosyl isocyanate and 14 parts N-dimethyl-m-toluidine are reacted in 16 parts benzene by the method described in Example 1. 32 parts of a viscous crystalline material are obtained from which pure p-dimethylamino-o-toluyl-p'-toluenesulfonyl imide of the formula

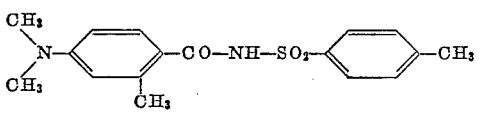

are obtained by recrystallization from alcohol. The compound melts at 174° to 176° C.

Example 11

20 parts tosyl isocyanate, 27 parts dibenzylaniline and 16 parts benzene are mixed and heated under reflux for one hour. The reaction mixture is allowed to stand for two days and then filtered. 44 parts crude p-dibenzylaminobenzoyl-p'-toluenesulfonyl imide of the formula

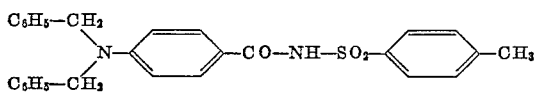

are obtained. The compound melts at 168° to 170° C. after recrystallization from alcohol.

Example 12

20 parts tosyl isocyanate, 16.1 parts N-o-tolylpyrrolidine are reacted in 16 parts benzene as described in Example 1. 20 parts crude p-pyrrolidino-m-toluyl-p'-toluenesulfonyl imide of the formula

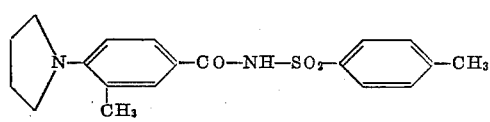

are obtained. The compound melts at 119° to 121° C. after recrystallization from alcohol.

Example 13

15.1 parts N-dimethyl-m-anisidine are reacted with 20 parts tosyl isocyanate in 16 parts benzene as described in Example 1. 23 parts crude p-dimethylamino-o-methoxybenzoyl-p'-toluenesulfonyl imide of the formula

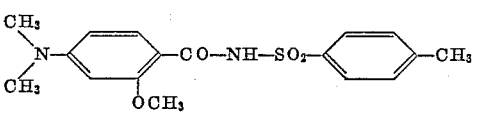

are obtained. The compound melts at 174° to 176° C. after recrystallization from dioxane.

Example 14

19 parts N-methyl-N-cyclohexylaniline are reacted with 20 parts tosyl isocyanate as described in Example 1. 30 parts crude p-(N-methyl-N-cyclohexylamino)-benzoyl-p'-toluenesulfonyl imide of the formula

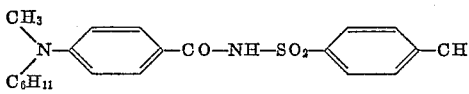

are obtained. The compound melts at 265° to 267° C. after recrystallization from ethylene glycol monomethyl ether.

Example 15

16.3 parts N-phenylmorpholine are reacted with 20 parts tosyl isocyanate as described in Example 1. 16 parts crude p-morpholinobenzoyl-p-toluenesulfonyl imide of the formula

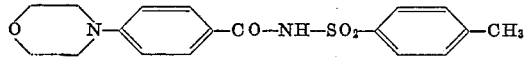

are obtained. The compound melts at 148° to 150° C. after recrystallization from a mixture of dioxane and cyclohexane.

Example 16

20 parts tosyl isocyanate and 19 parts N-ethyl-N-ethoxyethyl-aniline are dissolved in 16 parts benzene and boiled under reflux for two hours. 32 parts crude p-(N-ethyl-N-ethoxyethylamino)-benzoyl-p'-toluene-sulfonyl imide of the formula

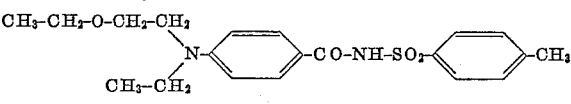

are obtained. The compound melts at 131° to 133° C. after recrystallization from benzene.

Example 17

20 parts tosyl isocyanate are reacted with 17.1 parts α-dimethylamino-naphthalene in benzene as described in Example 1. 27 parts of a crude imide which probably has the formula

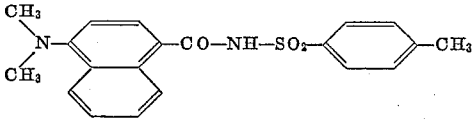

are obtained. The compound melts at 198° to 198° C. after recrystallization from ethyl acetate.

Example 18

39 parts tosyl isocyanate and 38 parts N-methylhexahydrocarbazole are dissolved in 40 parts benzene. The reaction mixture is allowed to stand for several days and then filtered. 58 parts of a crude imide of the following formula

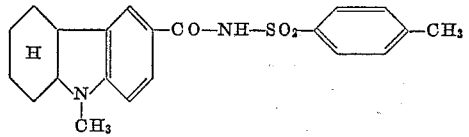

are obtained. The compound melts at 179° to 181° C.

Example 19

A solution of 14.2 parts chlorosulfonyl isocyanate in 10 parts benzene is added dropwise to a solution of 15 parts phenylpyrrolidine in 16 parts benzene at 20° C. The temperature rises to 50° C. An oily product is precipated which is insoluble in benzene and probably has the formula

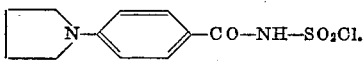

Example 20

6 parts dimethylaniline and 7.45 parts propane sulfonyl isocyanate are dissolved in 80 parts benzene and heated for two hours at 40° C. The solution is concentrated in vacuo and the product filtered off. 8 parts p-dimethyl-amino-benzoyl-propane-sulfonyl imide are obtained. The compound melts at 165° to 167° C. after recrystallization from alcohol.

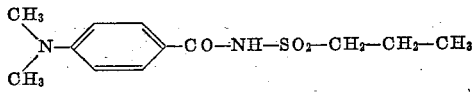

Example 21

7.45 parts diethylaniline and 7.45 parts propane-sulfonyl isocyanate are heated in 60 parts benzene for two hours at 40° C. The solution is concentrated in vacuo and the reaction product which separates out is pressed on a porous plate. 9 parts p-diethylamino-benzoyl-propanesulfonyl imide are obtained. The compound melts at 175° to 176° C. after recrystallization from alcohol.

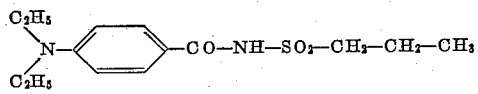

Example 22

8.4 parts dimethylaniline are reacted with 13 parts cyclohexylsulfonyl isocyanate in 30 parts benzene by the method described in Example 20. The p-dimethyl-amino-benzoyl-cyclohexylsulfony imide obtained melts at 194° to 196° C.

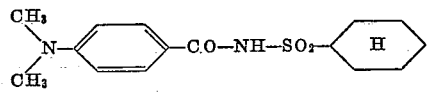

Example 23 p-Diethylamino-benzoyl-cyclohexylsulfonyl imide is obtained from 7.45 parts diethylaniline and 9.45 parts cyclohexylsulfonyl isocyanate by the method as described in Example 22. The product melts at 193° to 194° C. after recrystallization from alcohol.

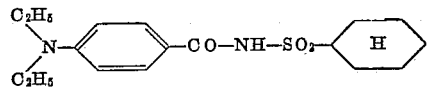

I claim:
1. A process for the production of aminoaroylsulfonyl imides selected from the group consisting of imides of the formulae

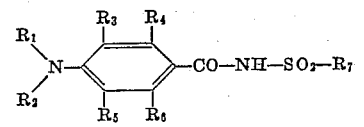

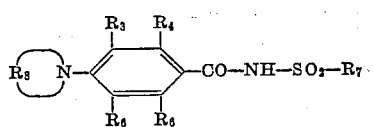 IV

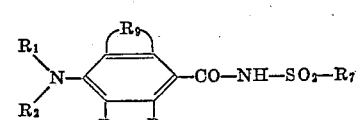 V and

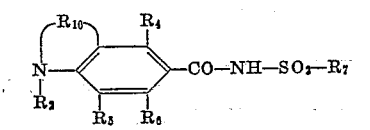 VI wherein $R_1$ and $R_2$ each denotes a member selected from the group consisting of cycloalkyl having 5 to 8 carbon atoms, aralkyl having 7 to 10 carbon atoms, alkyl having 1 to 6 carbon atoms, alkyl having 1 to 6 carbon atoms substituted by an alkoxy group with 1 to 4 carbon atoms, alkyl having 1 to 6 carbon atoms and substituted by a cyano group, and alkyl having 1 to 6 carbon atoms and substituted by chlorine, $R_3$, $R_4$, $R_5$ and $R_6$ each denotes a member selected from the group consisting of hydrogen, alkyl having 1 to 4 carbon atoms, alkoxy having 1 to 4 carbon atoms, chlorine and bromine, $R_7$ denotes a member selected from the group consisting of chlorine, alkyl having 1 to 6 carbon atoms, cycloalkyl having 5 to 8 carbon atoms and aryl having 6 to 10 carbon atoms, wherein $R_8$ is a divalent, saturated group consisting of —CH$_2$— groups, and zero to one —O— or —S— groups and forming with N atom a 5–6 membered ring; $R_9$ is a divalent hydrocarbon group forming a benzene ring with the two carbons to which $R_9$ is attached; and $R_{10}$ is a member from the group consisting of a divalent group forming a 5–6 membered heterocyclic ring with its N atom and a divalent group forming a 5–6 member heterocyclic ring with its N atom, said ring being condensed with a 6 carbon carbocylic ring, which comprises reacting a tertiary aromatic amine selected from the group consisting of an amine of the formula

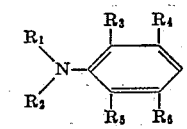 II

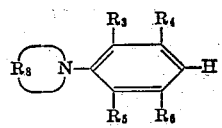

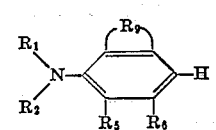

and

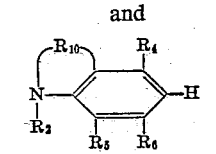

wherein $R_1$, $R_2$, $R_3$, $R_4$, $R_5$, $R_6$, $R_8$, $R_9$ and $R_{10}$ have the meaning given above, with a sulfonyl isocyanate of the formula $$OCN-SO_2-R_7 \qquad III$$

wherein $R_7$ has the meaning given above, in the presence of an inert organic solvent.

2. A process according to claim 1, wherein the reaction is carried out at a temperature between 25 and 80° C. and said tertiary aromatic amine is N,N-dimethylaniline.

3. A process for the production of p-aminobenzoyl-sulfonyl imides of the formula:

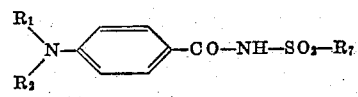 I wherein $R_1$ and $R_2$ are alkyl of 1–6 carbon atoms, $R_7$ denotes a member selected from the group consisting of chlorine, alkyl having 1 to 6 carbon atoms, cycloalkyl having 5 to 8 carbon atoms and aryl having 6 to 10 carbon atoms, which comprises reacting a tertiary aromatic amine of the formula:

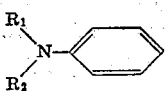 II wherein $R_1$ and $R_2$ have the respective meanings given above with a sulfonyl isocyanate of the formula OCN—$SO_2$—$R_7$, wherein $R_7$ has the meaning given above, in an inert, organic solvent.

References Cited

FOREIGN PATENTS 902,881   8/1962   Great Britain.

OTHER REFERENCES

Seefelder, Matthias, Chemical Abstracts, vol. 60, pages 4090–91, February (1964).

ALEX MAZEL, *Primary Examiner.*

J. TOVAR, *Assistant Examiner.*

UNITED STATES PATENT OFFICE
CERTIFICATE OF CORRECTION

Patent No. 3,340,297                                                   September 5, 1967

Matthias Seefelder

It is hereby certified that error appears in the above numbered patent requiring correction and that the said Letters Patent should read as corrected below.

Column 1, formula I, for that portion of the formula reading $-CO-NH-SO_2R_6$          read          $-CO-NH-SO_2R_7$ column 5, line 1, for "147° to 149° C." read -- 178° to 180° C. --; column 6, lines 3 to 6, for that portion of the formula reading $-CH$          read          $-CH_3$ line 23, for "19 parts" read -- 19.5 parts --; line 45, for "198° to 198° C." read -- 197° to 198° C. --; line 67, for "precipated" read -- precipitated --; column 7, line 28, for "-cyclohexylsulfony" read -- -cyclohexylsulfonyl --.

Signed and sealed this 22nd day of April 1969.

(SEAL)
Attest:

EDWARD M. FLETCHER, JR.                        EDWARD J. BRENNER
Attesting Officer                                   Commissioner of Patents